No. 789,517. PATENTED MAY 9, 1905.
R. C. WILLIAMSON.
FLOUR SIFTER.
APPLICATION FILED JAN. 4, 1905.

Witnesses
H. M. Baldwin

Inventor
R. C. Williamson
By Chandler & Chandler
Attorneys

No. 789,517. Patented May 9, 1905.

UNITED STATES PATENT OFFICE.

REASON C. WILLIAMSON, OF CARLISLE, IOWA.

FLOUR-SIFTER.

SPECIFICATION forming part of Letters Patent No. 789,517, dated May 9, 1905.

Application filed January 4, 1905. Serial No. 239,608.

*To all whom it may concern:*

Be it known that I, REASON C. WILLIAMSON, a citizen of the United States, residing at Carlisle, in the county of Warren, State of Iowa, have invented certain new and useful Improvements in Flour-Sifters; and I do hereby declare the following to be a full, clear, and exact description of the invention, such as will enable others skilled in the art to which it appertains to make and use the same.

This invention relates to sifters, and more particularly to flour-sifters, and has for its object to provide a sifter of novel construction which will facilitate the operation of sifting, especially when certain matter is to be sifted a number of times.

A further object is to provide a sifter so arranged that portions thereof may be used as pans and which will permit of the mixing of batter therein after the flour or other matter has been sifted without transferring the matter to another receptacle.

Other objects and advantages will be apparent from the following description, and it will be understood that changes in the specific construction shown and described may be made and that any suitable materials may be used without departing from the spirit of the invention.

Figure 1:
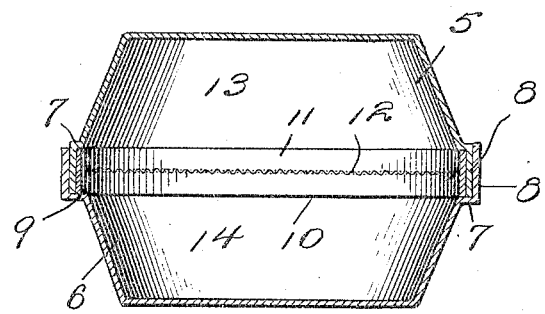
Figure 2:
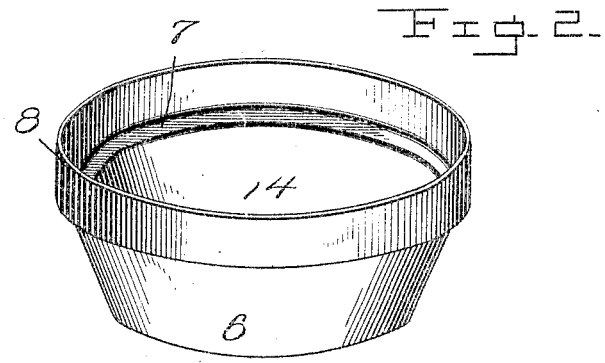
Figure 3:
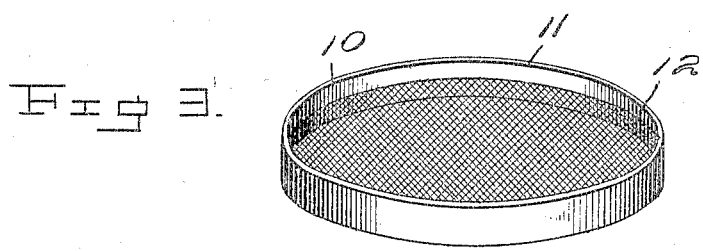

In the drawings forming a portion of this specification, and in which like numerals of reference indicate similar parts in the several views, Figure 1 is a vertical section of the present invention. Fig. 2 is a perspective view of one member. Fig. 3 is a perspective view of the sieve member.

Referring now to the drawings, the present invention comprises two pan-like receptacles 5 and 6. Adjacent to their free edges the sides of these receptacles are bent outwardly, as shown at 7, and again at right angles to the portions 7, as shown at 8. The portion 8 of the receptacle 5 is of a size to fit snugly within the similar portion of the receptacle 6, and the two receptacles may be thus removably connected. When connected in this manner, the free edge of the portion 8 of the receptacle 5 rests against the portion 7 of the receptacle 6, the latter portion extending inwardly of the portion which rests thereagainst to form a space 9.

A sieve 10 is provided and includes an inclosing wall 11, which is of a size and width to fit snugly within the space 9. The fabric 12 of the sieve divides the space within the connected receptacles into two compartments 13 and 14, as shown.

In sifting a quantity of flour or similar matter to be sifted is placed in the receptacle 5, after which the sieve 10 is placed within the inclosure of the portion 8 of this receptacle and the portion 8 of the receptacle 6 is then engaged with the receptacle 5, as described. The entire device is then shaken up and down until the contents is thoroughly sifted. The batter may be mixed in either of the receptacles and either of them may be used separately, as may be the sieve 10.

What is claimed is—

1. A device of the class described comprising two receptacles open at one end and closed at the other end, the portions of the receptacles adjacent to their free edges being offset laterally outwardly of the remaining portions thereof, the offset portion of one receptacle being of a size to receive the offset portion of the other receptacle snugly therewithin, and a sieve having an inclosing wall of a size to fit snugly within the innermost offset portion.

2. A device of the class described comprising pans having their portions adjacent to their free edges bent horizontally and then at right angles to extend vertically, the vertically-extending portion of one pan being of a size to fit within said portions of the other pan, the horizontal portion of the last-named pan extending inwardly of the vertical portion of the first-named pan when the pans are thus engaged, and a sieve including a foraminous plate and an inclosing wall disposed with its inclosing wall against the innermost vertical portion and with the edges thereof against the horizontal portions of the two pans, said sieve being of a size to fit snugly within the pans to prevent movement thereof.

In testimony whereof I affix my signature in presence of two witnesses.

REASON C. WILLIAMSON.

Witnesses:
DAVID FYL,
M. ELLIOTT.